(12) United States Patent
Niergarth et al.

(10) Patent No.: US 10,100,653 B2
(45) Date of Patent: Oct. 16, 2018

(54) VARIABLE PITCH FAN BLADE RETENTION SYSTEM

(71) Applicant: General Electric Company, Schenectady, NY (US)

(72) Inventors: Daniel Alan Niergarth, Cincinnati, OH (US); Ian Francis Prentice, Cincinnati, OH (US); Christopher James Kroger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 14/878,008

(22) Filed: Oct. 8, 2015

(65) Prior Publication Data
US 2017/0101877 A1 Apr. 13, 2017

(51) Int. Cl.
*F01D 5/32* (2006.01)
*F01D 7/00* (2006.01)
(Continued)

(52) U.S. Cl.
CPC ............ *F01D 5/323* (2013.01); *F01D 5/02* (2013.01); *F01D 5/12* (2013.01); *F01D 5/3007* (2013.01);
(Continued)

(58) Field of Classification Search
CPC ... F01D 5/323; F01D 5/12; F01D 7/00; F01D 5/3007; F01D 5/02; F02C 3/04;
(Continued)

(56) References Cited

U.S. PATENT DOCUMENTS

| 493,623 A | 3/1893 | Harris |
| 1,951,321 A | 3/1934 | Blanchard |

(Continued)

FOREIGN PATENT DOCUMENTS

| CA | 2241940 A1 | 7/1997 |
| CA | 2917362 A1 | 7/1997 |

(Continued)

OTHER PUBLICATIONS

European Search Report and Opinion issued in connection with related EP Application No. 15168754.8 dated Oct. 29, 2015.
(Continued)

*Primary Examiner* — Eldon Brockman
(74) *Attorney, Agent, or Firm* — General Electric Company; Pamela Kachur (57) ABSTRACT

A variable pitch fan for a gas turbine engine includes a fan blade defining a pitch axis and attached at a radially inner end to a trunnion mechanism. The variable pitch fan also includes a disk having a disk segment with the trunnion mechanism extending at least partially through the disk segment. A key is positioned at least partially in a key slot defined in a base of the trunnion mechanism, and further positioned adjacent to a support member of the disk segment. The key defines a first contact line between the key and the key slot and a second contact line between the key and the support member. The first and second contact lines respectively define a first contact reference line in a second contact reference line. The first and second contact reference lines define an angle with the pitch axis of the fan blade greater than zero degrees and less than ninety degrees.

20 Claims, 8 Drawing Sheets

(51) Int. Cl.
  *F04D 29/32* (2006.01)
  *F04D 29/64* (2006.01)
  *F01D 5/02* (2006.01)
  *F01D 5/12* (2006.01)
  *F01D 5/30* (2006.01)
  *F02C 3/04* (2006.01)
  *B64C 11/32* (2006.01)

(52) U.S. Cl.
  CPC ............... *F01D 7/00* (2013.01); *F02C 3/04* (2013.01); *F04D 29/323* (2013.01); *F04D 29/644* (2013.01); *B64C 11/32* (2013.01); *F05D 2220/32* (2013.01); *F05D 2240/30* (2013.01); *F05D 2240/35* (2013.01); *F05D 2260/70* (2013.01); *Y02T 50/673* (2013.01)

(58) Field of Classification Search
  CPC ............ F05D 2240/30; F05D 2240/35; F05D 2260/70; F05D 2220/32; F04D 29/329; B64C 11/06; B64C 11/48; B64D 2027/026; Y02T 50/66
  See application file for complete search history.

(56) References Cited

U.S. PATENT DOCUMENTS

| | | |
|---|---|---|
| 2,177,315 A | 10/1939 | De Caria |
| 2,353,334 A | 7/1944 | Haugh |
| 2,417,406 A | 3/1947 | Burkhalter, Jr. |
| 2,518,431 A | 8/1950 | Wildhaber |
| 2,566,696 A * | 9/1951 | Cushman ............... B64C 11/06 416/139 |
| 2,648,391 A | 8/1953 | Cushman et al. |
| 2,665,055 A | 1/1954 | Adams, Jr. |
| 2,955,656 A | 10/1960 | Balje et al. |
| 3,560,110 A | 2/1971 | Cornell |
| 3,687,569 A * | 8/1972 | Klompas ............... F01D 7/00 415/140 |
| 3,781,131 A * | 12/1973 | McMurtry ............... F01D 7/00 416/155 |
| 3,922,852 A | 12/1975 | Drabek |
| 3,988,889 A | 11/1976 | Chamay et al. |
| 3,994,128 A | 11/1976 | Griswold, Jr. et al. |
| 4,141,664 A | 2/1979 | Moran et al. |
| 4,411,596 A | 10/1983 | Chilman |
| 4,578,019 A | 3/1986 | Safarik |
| 4,671,737 A | 6/1987 | Whitehouse |
| 4,704,862 A | 11/1987 | Dennison et al. |
| 4,913,623 A | 4/1990 | Schilling et al. |
| 4,936,748 A | 6/1990 | Adamson et al. |
| 4,969,325 A | 11/1990 | Adamson et al. |
| 4,976,102 A | 12/1990 | Taylor |
| 5,010,729 A | 4/1991 | Adamson et al. |
| 5,015,150 A | 5/1991 | Rohra |
| 5,257,907 A | 11/1993 | Seidel |
| 5,263,898 A | 11/1993 | Ekston, III et al. |
| 5,284,418 A | 2/1994 | Moriya |
| 5,431,539 A | 7/1995 | Carvalho |
| 5,501,575 A | 3/1996 | Eldredge et al. |
| 5,529,263 A | 6/1996 | Rudolph |
| 5,542,357 A | 8/1996 | Gerhardt |
| 5,562,417 A | 10/1996 | Grimm et al. |
| 5,617,719 A | 4/1997 | Ginter |
| 5,630,701 A | 5/1997 | Lawer |
| 5,727,757 A | 3/1998 | Nyhus |
| 5,779,446 A | 7/1998 | Althof et al. |
| 5,810,555 A | 9/1998 | Savage et al. |
| 5,897,293 A | 4/1999 | Arel et al. |
| 5,904,320 A | 5/1999 | Tindell |
| 5,931,636 A | 8/1999 | Savage et al. |
| 5,967,461 A | 10/1999 | Farrington |
| 5,974,882 A | 11/1999 | Heath |
| 5,977,677 A | 11/1999 | Henry et al. |
| 5,988,307 A | 11/1999 | Yamada et al. |
| 6,000,635 A | 12/1999 | Justice |
| 6,027,383 A | 2/2000 | Broinowski |
| 6,071,077 A | 6/2000 | Rowlands |
| 6,109,871 A | 8/2000 | Nelson et al. |
| 6,112,512 A | 9/2000 | Miller et al. |
| 6,112,513 A | 9/2000 | Catt et al. |
| 6,112,523 A | 9/2000 | Kamo et al. |
| 6,148,605 A | 11/2000 | Lardellier |
| 6,158,894 A | 12/2000 | Pujari et al. |
| 6,173,908 B1 | 1/2001 | Bureaux et al. |
| 6,195,981 B1 | 3/2001 | Hanley et al. |
| 6,226,974 B1 | 5/2001 | Andrew et al. |
| 6,247,311 B1 | 6/2001 | Itoyama et al. |
| 6,260,794 B1 | 7/2001 | Rowe |
| 6,270,309 B1 | 8/2001 | Ghetzler et al. |
| 6,276,127 B1 | 8/2001 | Alberti |
| 6,289,666 B1 | 9/2001 | Ginter |
| 6,292,763 B1 | 9/2001 | Dunbar et al. |
| 6,308,740 B1 | 10/2001 | Smith et al. |
| 6,314,721 B1 | 11/2001 | Mathews et al. |
| 6,324,828 B1 | 12/2001 | Willis et al. |
| 6,332,313 B1 | 12/2001 | Willis et al. |
| 6,332,754 B1 | 12/2001 | Matsuda et al. |
| 6,349,682 B1 | 2/2002 | Alexius et al. |
| 6,386,830 B1 | 5/2002 | Slipper et al. |
| 6,416,015 B1 | 7/2002 | Carson |
| 6,422,816 B1 * | 7/2002 | Danielson ............ B64C 11/301 415/36 |
| 6,439,840 B1 | 8/2002 | Tse |
| 6,450,369 B1 | 9/2002 | Heyes |
| 6,464,459 B2 | 10/2002 | Illingworth |
| 6,499,286 B1 | 12/2002 | Zakharov et al. |
| 6,516,603 B1 | 2/2003 | Urbach et al. |
| 6,520,286 B1 | 2/2003 | Frederiksen et al. |
| 6,543,998 B1 | 4/2003 | Scharl |
| 6,557,503 B2 | 5/2003 | Hampson |
| 6,557,799 B1 | 5/2003 | Sternberger |
| 6,564,556 B2 | 5/2003 | Ginter |
| 6,565,334 B1 | 5/2003 | Bradbury et al. |
| 6,647,708 B2 | 11/2003 | Bornhoft et al. |
| 6,651,439 B2 | 11/2003 | Al-Roub et al. |
| 6,687,596 B2 | 2/2004 | Humerickhouse et al. |
| 6,691,515 B2 | 2/2004 | Verdouw et al. |
| 6,708,905 B2 | 3/2004 | Borissov et al. |
| 6,722,847 B2 | 4/2004 | Freeman et al. |
| 6,749,395 B1 | 6/2004 | Reichert et al. |
| 6,802,185 B2 | 10/2004 | Furukawa et al. |
| 6,820,431 B2 | 11/2004 | McManus et al. |
| 6,866,610 B2 | 3/2005 | Ito |
| 6,885,129 B1 | 4/2005 | Oohashi et al. |
| 6,885,917 B2 | 4/2005 | Osder et al. |
| 6,942,453 B2 | 9/2005 | Tsuru et al. |
| 6,942,458 B2 | 9/2005 | McCallum et al. |
| 6,964,170 B2 | 11/2005 | Alkabie |
| 6,969,235 B2 | 11/2005 | Feest |
| 6,981,365 B1 | 1/2006 | Johnson |
| 7,007,483 B2 | 3/2006 | Peters |
| 7,043,900 B2 | 5/2006 | Shirakawa et al. |
| 7,048,206 B2 | 5/2006 | Waelti et al. |
| 7,055,329 B2 | 6/2006 | Martens et al. |
| 7,083,773 B2 | 8/2006 | Kwon et al. |
| 7,100,868 B2 | 9/2006 | Stephan |
| RE39,479 E | 1/2007 | Tressler et al. |
| 7,189,059 B2 | 3/2007 | Barton et al. |
| 7,204,676 B2 | 4/2007 | Dutton et al. |
| 7,252,478 B2 | 8/2007 | Aynsley |
| 7,293,401 B2 | 11/2007 | Papamoschou |
| 7,306,434 B2 | 12/2007 | Goldfinch |
| 7,308,966 B2 | 12/2007 | Gupta |
| 7,310,951 B2 | 12/2007 | Kasahara |
| 7,318,619 B2 | 1/2008 | Munro et al. |
| 7,320,748 B2 | 1/2008 | Hemighaus et al. |
| 7,341,225 B2 | 3/2008 | Stretton et al. |
| 7,406,826 B2 | 8/2008 | Hayashi et al. |
| 7,424,413 B2 | 9/2008 | Brooke et al. |
| 7,503,750 B1 | 3/2009 | Violette |
| 7,520,124 B2 | 4/2009 | Narayanan et al. |
| 7,543,452 B2 | 6/2009 | Reba et al. |
| 7,549,293 B2 | 6/2009 | Gallagher et al. |

(56) References Cited

U.S. PATENT DOCUMENTS

| | | |
|---|---|---|
| 7,600,371 B2 | 10/2009 | Sternberger |
| 7,608,181 B2 | 10/2009 | O'Rear |
| 7,624,567 B2 | 12/2009 | Peters |
| 7,625,128 B2 | 12/2009 | Gillespie |
| 7,631,484 B2 | 12/2009 | Giffin et al. |
| 7,637,716 B2 | 12/2009 | Benton |
| 7,681,398 B2 | 3/2010 | Patel et al. |
| 7,735,601 B1 | 6/2010 | Stieger et al. |
| 7,753,036 B2 | 7/2010 | Lents et al. |
| 7,801,669 B2 | 9/2010 | Nagae |
| 7,863,767 B2 | 1/2011 | Chapple et al. |
| 7,878,130 B2 | 2/2011 | Yamamoto et al. |
| 7,901,657 B2 | 3/2011 | Arpac et al. |
| 7,918,090 B2 | 4/2011 | Suzuki et al. |
| 7,918,608 B2 | 4/2011 | Braun |
| 7,918,646 B2 | 4/2011 | Akcasu |
| 7,934,368 B2 | 5/2011 | Mueller et al. |
| 7,963,364 B2 | 6/2011 | Nadler et al. |
| 7,980,810 B2 | 7/2011 | Unno |
| 8,051,830 B2 | 11/2011 | Taylor |
| 8,074,440 B2 | 12/2011 | Kohlenberg et al. |
| 8,074,924 B2 | 12/2011 | Cros |
| 8,075,270 B2 | 12/2011 | Violette et al. |
| 8,087,251 B2 | 1/2012 | Iwasaki et al. |
| 8,087,870 B2 | 1/2012 | Flucker et al. |
| 8,089,173 B2 | 1/2012 | Freda |
| 8,092,150 B2 | 1/2012 | Rofka et al. |
| 8,100,665 B2 | 1/2012 | De Filippis et al. |
| 8,100,671 B2 | 1/2012 | Botros et al. |
| 8,122,724 B2 | 2/2012 | Slovisky et al. |
| RE43,252 E | 3/2012 | Ginter et al. |
| 8,133,027 B2 | 3/2012 | Carvalho et al. |
| 8,205,827 B2 | 6/2012 | Kerrebrock et al. |
| 8,220,443 B2 | 7/2012 | Murata et al. |
| 8,225,593 B2 | 7/2012 | Le Hong et al. |
| 8,261,527 B1 | 9/2012 | Stearns et al. |
| 8,262,358 B1 | 9/2012 | Muylaert et al. |
| 8,276,360 B2 | 10/2012 | Poisson et al. |
| 8,308,423 B2 | 11/2012 | Berryann et al. |
| 8,308,426 B2 | 11/2012 | Cigal et al. |
| 8,365,513 B2 | 2/2013 | McVey |
| 8,365,515 B2 | 2/2013 | Migliaro, Jr. |
| 8,366,382 B1 | 2/2013 | Muldoon et al. |
| 8,366,385 B2 | 2/2013 | Davis et al. |
| 8,376,696 B2 | 2/2013 | Suzuki et al. |
| 8,382,430 B2 | 2/2013 | Parry et al. |
| 8,387,570 B2 | 3/2013 | Firey |
| 8,413,418 B2 | 4/2013 | Mason et al. |
| 8,418,436 B2 | 4/2013 | Pero et al. |
| 8,418,964 B2 | 4/2013 | Leblanc et al. |
| 8,439,637 B2 | 5/2013 | Dibenedetto et al. |
| 8,443,586 B2 | 5/2013 | Schwark, Jr. et al. |
| 8,448,451 B2 | 5/2013 | Nakamura et al. |
| 8,453,458 B2 | 6/2013 | Whurr et al. |
| 8,460,779 B2 | 6/2013 | Gupta et al. |
| 8,499,626 B2 | 8/2013 | Greciet et al. |
| 8,517,665 B2 | 8/2013 | Lugo et al. |
| 8,529,192 B2 | 9/2013 | Beers et al. |
| 8,544,793 B1 | 10/2013 | Shammoh |
| 8,562,284 B2 | 10/2013 | Bradbrook |
| 8,572,943 B1 | 11/2013 | Sheridan |
| 8,601,786 B2 | 12/2013 | Hurwitz et al. |
| 8,606,543 B2 | 12/2013 | Naslund et al. |
| 8,622,697 B2 | 1/2014 | Bortoli et al. |
| 8,646,721 B2 | 2/2014 | Chapman et al. |
| 8,668,463 B2 | 3/2014 | Yilmaz |
| 8,702,381 B2 | 4/2014 | Alajbegovic et al. |
| 8,708,256 B2 | 4/2014 | Kobayashi |
| 8,708,640 B2 | 4/2014 | Power |
| 8,713,910 B2 | 5/2014 | Stuart et al. |
| 8,747,054 B2 | 6/2014 | Witlicki |
| 8,777,793 B2 | 7/2014 | Sheridan |
| 8,793,971 B2 | 8/2014 | Dyer et al. |
| 8,794,542 B1 | 8/2014 | Hunter et al. |
| 8,794,846 B2 | 8/2014 | Hashish |
| 8,794,910 B2 | 8/2014 | Gasmen et al. |
| 8,806,850 B2 | 8/2014 | Winter et al. |
| 8,807,921 B2 | 8/2014 | Struziak |
| 8,814,502 B2 | 8/2014 | Eleftheriou |
| 8,814,510 B2 | 8/2014 | Colson et al. |
| 8,820,090 B2 | 9/2014 | Lee et al. |
| 8,820,091 B2 | 9/2014 | Tham et al. |
| 8,827,203 B2 | 9/2014 | Balk |
| 8,827,639 B2 | 9/2014 | Beers et al. |
| 8,834,028 B2 | 9/2014 | Winkler et al. |
| 8,834,095 B2 | 9/2014 | Davis |
| 8,834,099 B1 | 9/2014 | Topol et al. |
| 8,840,375 B2 | 9/2014 | Virkler |
| 8,851,754 B2 | 10/2014 | Dettmar et al. |
| 8,857,149 B1 | 10/2014 | Muldoon |
| 8,857,193 B2 | 10/2014 | Thies |
| 8,863,529 B2 | 10/2014 | Starr |
| 9,090,336 B2 | 7/2015 | Gallet |
| 2002/0124991 A1 | 9/2002 | Wilson et al. |
| 2002/0162394 A1 | 11/2002 | Loftus et al. |
| 2003/0163983 A1 | 9/2003 | Seda et al. |
| 2003/0163984 A1 | 9/2003 | Seda et al. |
| 2003/0215330 A1 | 11/2003 | Haller |
| 2004/0123583 A1 | 7/2004 | Nordeen et al. |
| 2004/0129392 A1 | 7/2004 | Crane et al. |
| 2004/0261396 A1 | 12/2004 | Sammann et al. |
| 2005/0068232 A1 | 3/2005 | Smith et al. |
| 2005/0178105 A1 | 8/2005 | Kawamoto et al. |
| 2005/0241292 A1 | 11/2005 | Taylor et al. |
| 2005/0276693 A1 | 12/2005 | Liu |
| 2006/0024162 A1 | 2/2006 | Giffin |
| 2006/0090451 A1 | 5/2006 | Moniz et al. |
| 2006/0096293 A1 | 5/2006 | Norris et al. |
| 2006/0272314 A1 | 12/2006 | Moniz et al. |
| 2006/0275111 A1 | 12/2006 | Orlando et al. |
| 2007/0084186 A1 | 4/2007 | Orlando et al. |
| 2007/0130959 A1 | 6/2007 | Linet et al. |
| 2007/0157595 A1 | 7/2007 | Lockwood, Jr. |
| 2008/0022691 A1 | 1/2008 | Kennepohl et al. |
| 2008/0056894 A1 | 3/2008 | Tsifourdaris et al. |
| 2008/0089630 A1 | 4/2008 | Glueck |
| 2008/0098713 A1 | 5/2008 | Orlando et al. |
| 2008/0118360 A1 | 5/2008 | Findlay et al. |
| 2008/0124221 A1 | 5/2008 | Kidikian et al. |
| 2008/0138195 A1 | 6/2008 | Kern et al. |
| 2008/0140352 A1 | 6/2008 | Goebel et al. |
| 2008/0143108 A1 | 6/2008 | El-Refaie et al. |
| 2008/0149445 A1 | 6/2008 | Kern et al. |
| 2008/0155961 A1 | 7/2008 | Johnson |
| 2008/0273969 A1 | 11/2008 | Murrow et al. |
| 2008/0283676 A1 | 11/2008 | Jain et al. |
| 2009/0004008 A1 | 1/2009 | Richards |
| 2009/0016870 A1 | 1/2009 | Kodama et al. |
| 2009/0068003 A1 | 3/2009 | Sharma et al. |
| 2009/0112535 A1 | 4/2009 | Phillips |
| 2009/0133381 A1 | 5/2009 | Holmes et al. |
| 2009/0199536 A1 | 8/2009 | Bulin et al. |
| 2009/0211221 A1 | 8/2009 | Roberge |
| 2009/0257878 A1 | 10/2009 | Hernandez et al. |
| 2009/0314082 A1 | 12/2009 | Sujan et al. |
| 2010/0000222 A1 | 1/2010 | Price et al. |
| 2010/0019101 A1 | 1/2010 | Smith et al. |
| 2010/0034659 A1 | 2/2010 | Fujimura |
| 2010/0058769 A1 | 3/2010 | Baran |
| 2010/0061856 A1 | 3/2010 | Demania et al. |
| 2010/0061860 A1 | 3/2010 | Riaz et al. |
| 2010/0061861 A1 | 3/2010 | Riaz et al. |
| 2010/0089019 A1 | 4/2010 | Knight et al. |
| 2010/0092295 A1 | 4/2010 | Riaz et al. |
| 2010/0154761 A1 | 6/2010 | Okumura et al. |
| 2010/0192595 A1 | 8/2010 | Orlando et al. |
| 2010/0193644 A1 | 8/2010 | Karem |
| 2010/0280730 A1 | 11/2010 | Page et al. |
| 2010/0300087 A1 | 12/2010 | Liu et al. |
| 2010/0305011 A1 | 12/2010 | Frapin et al. |
| 2010/0326753 A1 | 12/2010 | Garside |
| 2011/0004388 A1 | 1/2011 | Winter |
| 2011/0036086 A1 | 2/2011 | Liu et al. |
| 2011/0052370 A1 | 3/2011 | Karpman et al. |

(56) References Cited

U.S. PATENT DOCUMENTS

| | | |
|---|---|---|
| 2011/0061381 A1 | 3/2011 | Harris et al. |
| 2011/0076158 A1 | 3/2011 | Giffin et al. |
| 2011/0083641 A1 | 4/2011 | Gokhale et al. |
| 2011/0092726 A1 | 4/2011 | Clarke |
| 2011/0118071 A1 | 5/2011 | De Maziere |
| 2011/0120082 A1 | 5/2011 | Giffin et al. |
| 2011/0167784 A1 | 7/2011 | Johnson et al. |
| 2011/0167792 A1 | 7/2011 | Johnson et al. |
| 2011/0167831 A1 | 7/2011 | Johnson |
| 2011/0189003 A1 | 8/2011 | Iida |
| 2011/0243719 A1 | 10/2011 | Murphy et al. |
| 2011/0268578 A1 | 11/2011 | Praisner et al. |
| 2011/0277448 A1 | 11/2011 | Roberts |
| 2011/0286842 A1 | 11/2011 | Danielson et al. |
| 2011/0288744 A1 | 11/2011 | Gokhale et al. |
| 2011/0290483 A1 | 12/2011 | Zornes |
| 2012/0011825 A1 | 1/2012 | Hall et al. |
| 2012/0036843 A1 | 2/2012 | Schertz et al. |
| 2012/0045334 A1 | 2/2012 | Bouru et al. |
| 2012/0056034 A1 | 3/2012 | Kosheleff |
| 2012/0073263 A1 | 3/2012 | Kohlenberg et al. |
| 2012/0085861 A1 | 4/2012 | Mardjono et al. |
| 2012/0087780 A1 | 4/2012 | Suciu et al. |
| 2012/0096853 A1 | 4/2012 | Taylor |
| 2012/0097801 A1 | 4/2012 | Barrett |
| 2012/0110979 A1 | 5/2012 | Rosenkrans et al. |
| 2012/0117940 A1 | 5/2012 | Winter |
| 2012/0117975 A1 | 5/2012 | Sharma et al. |
| 2012/0121390 A1 | 5/2012 | Suciu et al. |
| 2012/0152007 A1 | 6/2012 | Holmes et al. |
| 2012/0171018 A1 | 7/2012 | Hasel et al. |
| 2012/0174593 A1 | 7/2012 | Sharma et al. |
| 2012/0198815 A1 | 8/2012 | Suciu et al. |
| 2012/0198816 A1 | 8/2012 | Suciu et al. |
| 2012/0198817 A1 | 8/2012 | Suciu et al. |
| 2012/0210710 A1 | 8/2012 | Chevalier et al. |
| 2012/0210711 A1 | 8/2012 | Petrovic et al. |
| 2012/0222397 A1 | 9/2012 | Smith et al. |
| 2012/0222398 A1 | 9/2012 | Smith et al. |
| 2012/0237334 A1 | 9/2012 | McCune et al. |
| 2012/0238401 A1 | 9/2012 | McCune et al. |
| 2012/0251306 A1 | 10/2012 | Reinhardt et al. |
| 2012/0255292 A1 | 10/2012 | Fong et al. |
| 2012/0257960 A1 | 10/2012 | Reinhardt et al. |
| 2012/0275904 A1 | 11/2012 | McCune et al. |
| 2012/0279198 A1 | 11/2012 | Erickson et al. |
| 2012/0291449 A1 | 11/2012 | Adams et al. |
| 2012/0292440 A1 | 11/2012 | Kosheleff |
| 2012/0321476 A1 | 12/2012 | Mackie et al. |
| 2012/0328436 A1 | 12/2012 | Soidel et al. |
| 2013/0000314 A1 | 1/2013 | McCaffrey |
| 2013/0004297 A1 | 1/2013 | Sheridan |
| 2013/0008144 A1 | 1/2013 | Gallagher et al. |
| 2013/0008146 A1 | 1/2013 | Gallagher et al. |
| 2013/0011261 A1 | 1/2013 | Boston et al. |
| 2013/0014490 A1 | 1/2013 | Suciu et al. |
| 2013/0028733 A1 | 1/2013 | McCune |
| 2013/0067917 A1 | 3/2013 | Nagurney et al. |
| 2013/0068200 A1 | 3/2013 | Reynolds et al. |
| 2013/0074492 A1 | 3/2013 | Chi et al. |
| 2013/0074512 A1 | 3/2013 | Tillery |
| 2013/0081374 A1 | 4/2013 | Giffin et al. |
| 2013/0091852 A1 | 4/2013 | Wood et al. |
| 2013/0094937 A1 | 4/2013 | Glahn et al. |
| 2013/0094943 A1 | 4/2013 | Bouru et al. |
| 2013/0096786 A1 | 4/2013 | Jang |
| 2013/0098046 A1 | 4/2013 | Suciu et al. |
| 2013/0098050 A1 | 4/2013 | Kupratis |
| 2013/0098055 A1 | 4/2013 | Kupratis |
| 2013/0104560 A1 | 5/2013 | Kupratis |
| 2013/0125561 A1 | 5/2013 | Schwarz et al. |
| 2013/0139519 A1 | 6/2013 | Kesseli et al. |
| 2013/0145745 A1 | 6/2013 | Kohlenberg et al. |
| 2013/0149099 A1 | 6/2013 | Kohlenberg et al. |
| 2013/0149111 A1 | 6/2013 | Kohlenberg et al. |
| 2013/0149112 A1 | 6/2013 | Kohlenberg et al. |
| 2013/0163905 A1 | 6/2013 | Vintinner et al. |
| 2013/0186060 A1 | 7/2013 | Kosheleff |
| 2013/0186191 A1 | 7/2013 | Djelassi |
| 2013/0189117 A1 | 7/2013 | Baltas et al. |
| 2013/0192199 A1 | 8/2013 | Merry et al. |
| 2013/0192200 A1 | 8/2013 | Kupratis et al. |
| 2013/0192201 A1 | 8/2013 | Kupratis et al. |
| 2013/0192232 A1 | 8/2013 | Clemen |
| 2013/0192238 A1 | 8/2013 | Munsell et al. |
| 2013/0192239 A1 | 8/2013 | Glahn et al. |
| 2013/0192240 A1 | 8/2013 | Munsell et al. |
| 2013/0192241 A1 | 8/2013 | Blackwell et al. |
| 2013/0192242 A1 | 8/2013 | Davis et al. |
| 2013/0192247 A1 | 8/2013 | Blackwell et al. |
| 2013/0192248 A1 | 8/2013 | Ackermann et al. |
| 2013/0192250 A1 | 8/2013 | Glahn et al. |
| 2013/0192251 A1 | 8/2013 | Munsell et al. |
| 2013/0192252 A1 | 8/2013 | Ackermann et al. |
| 2013/0192253 A1 | 8/2013 | Ackermann et al. |
| 2013/0192256 A1 | 8/2013 | Suciu et al. |
| 2013/0192258 A1 | 8/2013 | Kupratis et al. |
| 2013/0192260 A1 | 8/2013 | Mayer et al. |
| 2013/0192261 A1 | 8/2013 | Mayer et al. |
| 2013/0192262 A1 | 8/2013 | Eastwood et al. |
| 2013/0192266 A1 | 8/2013 | Houston et al. |
| 2013/0192519 A1 | 8/2013 | Kim et al. |
| 2013/0195624 A1 | 8/2013 | Schwarz et al. |
| 2013/0195641 A1 | 8/2013 | Povey |
| 2013/0195645 A1 | 8/2013 | Suciu et al. |
| 2013/0195647 A1 | 8/2013 | Muldoon et al. |
| 2013/0199179 A1 | 8/2013 | Kitsukawa et al. |
| 2013/0209291 A1 | 8/2013 | Kitsukawa et al. |
| 2013/0216364 A1 | 8/2013 | Evans |
| 2013/0219856 A1 | 8/2013 | Suciu et al. |
| 2013/0219859 A1 | 8/2013 | Suciu et al. |
| 2013/0219860 A1 | 8/2013 | Suciu et al. |
| 2013/0219895 A1 | 8/2013 | Joshi et al. |
| 2013/0219908 A1 | 8/2013 | Schwarz et al. |
| 2013/0219922 A1 | 8/2013 | Gilson et al. |
| 2013/0220288 A1 | 8/2013 | Klingbeil |
| 2013/0223973 A1 | 8/2013 | Ali |
| 2013/0223992 A1 | 8/2013 | Suciu et al. |
| 2013/0223993 A1 | 8/2013 | Merry et al. |
| 2013/0233970 A1 | 9/2013 | Cottet |
| 2013/0236296 A1 | 9/2013 | Collopy et al. |
| 2013/0255275 A1 | 10/2013 | Schwarz et al. |
| 2013/0259651 A1 | 10/2013 | Kupratis et al. |
| 2013/0259653 A1 | 10/2013 | Schwarz et al. |
| 2013/0263592 A1 | 10/2013 | Lotterman et al. |
| 2013/0269311 A1 | 10/2013 | Wichmann et al. |
| 2013/0269479 A1 | 10/2013 | Van Der Merwe et al. |
| 2013/0276424 A1 | 10/2013 | Topol et al. |
| 2013/0277443 A1 | 10/2013 | Croll et al. |
| 2013/0280031 A1 | 10/2013 | Hurlin et al. |
| 2013/0283821 A1 | 10/2013 | Gilson et al. |
| 2013/0287581 A1 | 10/2013 | Aschermann et al. |
| 2013/0298522 A1 | 11/2013 | Eleftheriou et al. |
| 2013/0305714 A1 | 11/2013 | Rollinger et al. |
| 2013/0305731 A1 | 11/2013 | Morris et al. |
| 2013/0318939 A1 | 12/2013 | Parnin et al. |
| 2013/0318988 A1 | 12/2013 | Robinson |
| 2013/0318998 A1 | 12/2013 | Schwarz et al. |
| 2013/0319010 A1 | 12/2013 | Hui et al. |
| 2013/0321824 A1 | 12/2013 | Hockaday |
| 2013/0323012 A1 | 12/2013 | Dong et al. |
| 2013/0323072 A1 | 12/2013 | Aschermann et al. |
| 2013/0334824 A1 | 12/2013 | Freda |
| 2013/0340406 A1 | 12/2013 | Gallagher et al. |
| 2013/0343876 A1 | 12/2013 | Leblanc et al. |
| 2013/0343896 A1 | 12/2013 | Mackie et al. |
| 2014/0000269 A1 | 1/2014 | Idahosa et al. |
| 2014/0003915 A1 | 1/2014 | Topol et al. |
| 2014/0007585 A1 | 1/2014 | Liu |
| 2014/0030087 A1 | 1/2014 | Soria et al. |
| 2014/0044540 A1 | 2/2014 | Uneura |
| 2014/0061392 A1 | 3/2014 | Karem |
| 2014/0083107 A1 | 3/2014 | Sheridan et al. |
| 2014/0083115 A1 | 3/2014 | Von Nieda |

(56) References Cited

U.S. PATENT DOCUMENTS

| | | |
|---|---|---|
| 2014/0093350 A1 | 4/2014 | Meisner et al. |
| 2014/0096508 A1 | 4/2014 | McCune et al. |
| 2014/0096509 A1 | 4/2014 | Hasel |
| 2014/0096534 A1 | 4/2014 | Snape et al. |
| 2014/0109571 A1 | 4/2014 | Primus et al. |
| 2014/0112774 A1 | 4/2014 | Freeman et al. |
| 2014/0112784 A1 | 4/2014 | Pascal |
| 2014/0125121 A1 | 5/2014 | Edwards et al. |
| 2014/0130503 A1 | 5/2014 | Leep |
| 2014/0148928 A1 | 5/2014 | Stewart |
| 2014/0154064 A1 | 6/2014 | Bouteiller et al. |
| 2014/0157752 A1 | 6/2014 | Hasel et al. |
| 2014/0157753 A1 | 6/2014 | Hasel et al. |
| 2014/0157754 A1 | 6/2014 | Hasel et al. |
| 2014/0157755 A1 | 6/2014 | Hasel et al. |
| 2014/0157756 A1 | 6/2014 | Hasel et al. |
| 2014/0157757 A1 | 6/2014 | Hasel et al. |
| 2014/0165534 A1 | 6/2014 | Hasel et al. |
| 2014/0174056 A1 | 6/2014 | Suciu et al. |
| 2014/0174858 A1 | 6/2014 | Remer et al. |
| 2014/0182309 A1 | 7/2014 | Ali |
| 2014/0186158 A1 | 7/2014 | Merry et al. |
| 2014/0190163 A1 | 7/2014 | Maier |
| 2014/0193238 A1 | 7/2014 | Sheridan et al. |
| 2014/0196472 A1 | 7/2014 | Kupratis et al. |
| 2014/0196473 A1 | 7/2014 | Kupratis et al. |
| 2014/0202133 A1 | 7/2014 | Praisner et al. |
| 2014/0205438 A1 | 7/2014 | Hasel |
| 2014/0205457 A1 | 7/2014 | Curlier et al. |
| 2014/0216003 A1 | 8/2014 | Phillips et al. |
| 2014/0219783 A1 | 8/2014 | Coffin et al. |
| 2014/0234078 A1 | 8/2014 | Sheridan et al. |
| 2014/0234089 A1 | 8/2014 | Moradell-Casellas et al. |
| 2014/0245749 A1 | 9/2014 | Mercier et al. |
| 2014/0248116 A1 | 9/2014 | Ali |
| 2014/0248129 A1 | 9/2014 | Merry et al. |
| 2014/0260326 A1 | 9/2014 | Schwarz et al. |
| 2014/0263712 A1 | 9/2014 | Froemming et al. |
| 2014/0270605 A1 | 9/2014 | Rosen et al. |
| 2014/0271112 A1 | 9/2014 | Morin et al. |
| 2014/0271135 A1 | 9/2014 | Sheridan et al. |
| 2014/0277991 A1 | 9/2014 | Skertic et al. |
| 2014/0283500 A1 | 9/2014 | Sabnis |
| 2014/0290211 A1 | 10/2014 | Kupratis et al. |
| 2014/0301837 A1 | 10/2014 | Dezeustre et al. |
| 2014/0308123 A1 | 10/2014 | Nussenblatt et al. |
| 2014/0314541 A1 | 10/2014 | Schwarz et al. |
| 2014/0326826 A1 | 11/2014 | Certain |
| 2015/0337901 A1 | 11/2015 | Hayashi et al. |
| 2016/0290228 A1 | 10/2016 | van der Merwe et al. |

FOREIGN PATENT DOCUMENTS

| | | |
|---|---|---|
| CA | 2798211 A1 | 6/2013 |
| CN | 1251640 A | 4/2000 |
| CN | 102220904 A | 10/2011 |
| CN | 102483038 A | 5/2012 |
| EP | 0992696 A1 | 4/2000 |
| EP | 1254831 A1 | 11/2002 |
| EP | 2009246 A2 | 12/2008 |
| EP | 2607231 A2 | 6/2013 |
| FR | 2964942 A1 | 3/2012 |
| GB | 1418905 A | 12/1975 |
| GB | 2218747 A | 11/1989 |
| GB | 2226087 A | 6/1990 |
| JP | 50124011 A | 9/1975 |
| JP | 61275550 A | 12/1986 |
| JP | 1314696 A | 12/1989 |
| JP | 0216335 A | 1/1990 |
| JP | 0224293 A | 1/1990 |
| JP | 02179598 A | 7/1990 |
| JP | 02238160 A | 9/1990 |
| JP | 02245455 A | 10/1990 |
| JP | 05149328 A | 6/1993 |
| JP | 05149329 A | 6/1993 |
| JP | 05164132 A | 6/1993 |
| JP | 2003286857 A | 10/2003 |
| JP | 2006046322 A | 2/2006 |
| JP | 2007192315 A | 8/2007 |
| JP | 2008519229 A | 6/2008 |
| JP | 2009115139 A | 5/2009 |
| JP | 2010001992 A | 1/2010 |
| JP | 2012521516 A | 9/2012 |
| JP | 2013523526 A | 6/2013 |
| JP | 2013256397 A | 12/2013 |
| JP | 2014088893 A | 5/2014 |
| JP | 2014152788 A | 8/2014 |
| JP | 2014520035 A | 8/2014 |
| JP | 2014173635 A | 9/2014 |
| JP | 2015059645 A | 3/2015 |
| WO | 2006080055 A1 | 8/2006 |
| WO | 2008117413 A1 | 10/2008 |

OTHER PUBLICATIONS

U.S. Non-Final Office Action issued in connection with related U.S. Appl. No. 14/873,382, dated Jan. 25, 2016.

European Search Report and Opinion issued in connection with related EP Application No. 15195349.4 dated Mar. 21, 2016.

Canadian Office Action issued in connection with related CA Application No. 2891864 dated May 16, 2016.

Unofficial English Translation of Japanese Office Action issued in connection with related JP Application No. 2015105048 dated May 31, 2016.

U.S. Final Office Action issued in connection with related U.S. Appl. No. 14/873,382 dated Jul. 20, 2016.

European Search Report and Opinion issued in connection with related EP Application No. 16163745.9 dated Sep. 13, 2016.

Unofficial English Translation of Japanese Notice of Allowance issued in connection with related JP Application No. 2015105048 dated Dec. 20, 2016.

Unofficial English Translation of Japanese Search Report issued in connection with related JP Application No. 2016066996 dated Feb. 8, 2017.

Unofficial English Translation of Japanese Office Action issued in connection with related JP Application No. 2016066996 dated Feb. 21, 2017.

Canadian Office Action issued in connection with related CA Application No. 2924931 dated Feb. 27, 2017.

European Search Report and Opinion issued in connection with related EP Application No. 16192205.9 dated Mar. 2, 2017.

Canadian Office Action issued in connection with related CA Application No. 2891864 dated Mar. 21, 2017.

U.S. Non Final Rejection issued in connection with related U.S. Appl. No. 14/708,353 dated May 24, 2017.

Chinese Office Action issued in connection with related CN Application No. 201510285220.8 dated Jun. 2, 2017.

Japanese Notice of Allowance issued in connection with related JP Application No. 2016066996 dated Jul. 4, 2017.

Miller et al., Variable pitch fan for gas turbine engine and method of assembling the same, GE U.S. Appl. No. 62/082,875, filed Nov. 21, 2014.

Niergarth et al., Variable-pitch rotor with remote counterweights, GE U.S. Appl. No. 62/005,572, filed May 30, 2014.

Machine translation and Office Action issued in connection with corresponding CN Application No. 201610883280.4 dated Jul. 24, 2018.

* cited by examiner

VARIABLE PITCH FAN BLADE RETENTION SYSTEM

FIELD OF THE INVENTION

The present subject matter relates generally to a retention system for a variable pitch fan blade in a gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, an airflow is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by one or more shafts extending along an axial direction of the gas turbine engine.

Additionally, for at least some gas turbine engines, the fan is a variable pitch fan including a plurality of fan blades. Each of the fan blades may be rotatably attached to a disk about respective pitch axes, and the disk may be rotatable about a central axis by the one or more shafts of the core. For example, each fan blade can be attached to a trunnion mechanism which extends through an individual disk segment of the disk. The trunnion mechanism can, in turn, be retained within a respective disk segment by a keyed connection. For example, the trunnion mechanism may define a key slot and the disk segment may include a support surface. A key positioned in the key slot interacts with the key slot and the support surface to retain the trunnion mechanism within the respective disk segments.

However, the keyed connection may be required to withstand substantially all of the centrifugal forces on the fan blade during operation of the fan—the centrifugal forces acting in a direction parallel to the pitch axis. Accordingly, the keyed connections must be made relatively large and robust to support such forces. Thus, a keyed connection for a variable pitch fan blade capable of reducing ineffective force on the keyed connection would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a variable pitch fan for a gas turbine engine is provided. The variable pitch fan includes a fan blade defining a radially inner end and a pitch axis. The variable pitch fan also includes a trunnion mechanism including a base defining a key slot. The radially inner end of the fan blade is attached to the trunnion mechanism. The variable pitch fan also includes a disk including a disk segment having a support member, the base of the trunnion mechanism extending at least partially through the disk segment. The variable pitch fan also includes a key positioned at least partially in the key slot of the base of the trunnion mechanism and adjacent to the support member of the disk segment for retaining the base of the trunnion mechanism at least partially within the disk segment. The key defines a first contact line between the key and the key slot and a second contact line between the key and the support member. The first and second contact lines respectively define a first contact reference line and a second contact reference line. The first and second contact reference lines define an angle with the pitch axis of the fan blade greater than zero degrees (0°) and less than ninety degrees (90°).

In another exemplary embodiment of the present disclosure, a gas turbine engine is provided. The gas turbine engine includes a core and a variable pitch fan in airflow communication with the core. The variable pitch fan includes a fan blade defining a radially inner end and a pitch axis. The variable pitch fan also includes a trunnion mechanism including a base defining a key slot, the radially inner end of the fan blade attached to the trunnion mechanism. The variable pitch fan also includes a disk including a disk segment having a support member, the base of the trunnion mechanism extending at least partially through the disk segment. The variable pitch fan also includes a key positioned at least partially in the key slot of the base of the trunnion mechanism and adjacent to the support member of the disk segment for retaining the base of the trunnion mechanism at least partially within the disk segment. The key defines a first contact line between the key and the key slot and a second contact line between the key and the support member. The first and second contact lines respectively define a first contact reference line and a second contact reference line. The first and second contact reference lines define an angle with the pitch axis of the fan blade greater than zero degrees (0°) and less than ninety degrees (90°).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
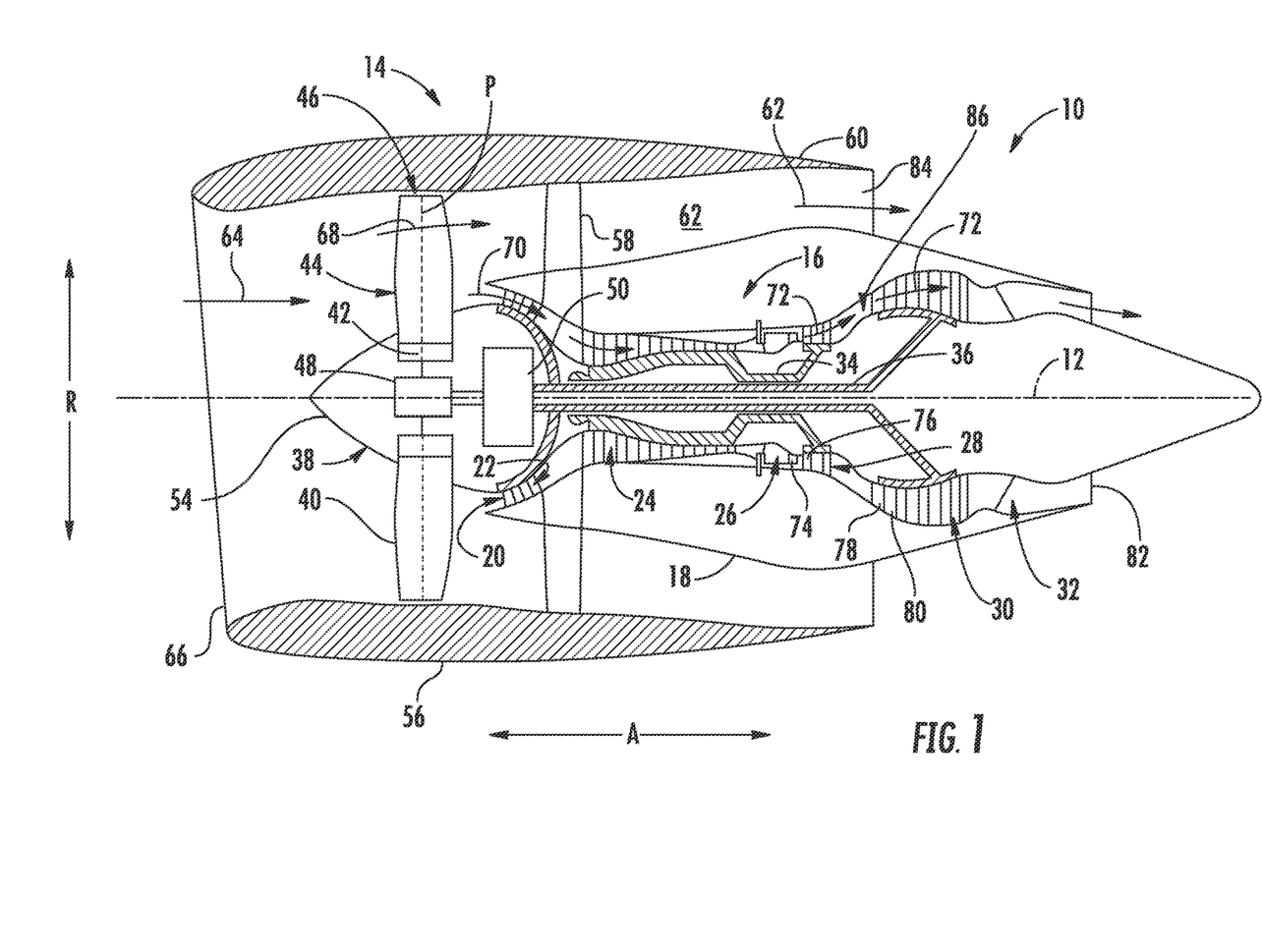
FIG. 1 is a schematic cross-sectional view of a gas turbine engine according to an exemplary embodiment of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the plurality of fan blades 40 define a leading edge 44, or upstream edge, and a tip 46 defined at a radially outer edge of each respective fan blade 40. Each fan blade 40 is also rotatable relative to the disk 42 about a pitch axis P by virtue of the fan blades 40 being operatively coupled to a suitable actuation member 48 configured to collectively vary the pitch of the fan blades 40 in unison. For the embodiment depicted, the pitch axis P is substantially parallel to the radial direction R. The fan blades 40, disk 42, and actuation member 48 are together rotatable about the longitudinal axis 12 by LP shaft 36 across a power gear box 50. The power gear box 50 includes a plurality of gears for stepping down the rotational speed of the LP shaft 36 to a more efficient rotational fan speed.

Referring still to the exemplary turbofan engine 10 of FIG. 1, including the variable pitch fan 38, the disk 42 of the variable pitch fan 38 is covered by rotatable front hub 54 aerodynamically contoured to promote an airflow through the plurality of fan blades 40. Additionally, the exemplary fan section 14 includes an annular fan casing or outer nacelle 56 that circumferentially surrounds the fan 38 and/or at least a portion of the core turbine engine 16. It should be appreciated that the nacelle 56 may be configured to be supported relative to the core turbine engine 16 by a plurality of circumferentially-spaced outlet guide vanes 58. Moreover, a downstream section 60 of the nacelle 56 may extend over an outer portion of the core turbine engine 16 so as to define a bypass airflow passage 62 therebetween.

During operation of the turbofan engine 10, a volume of air 64 enters the turbofan 10 through an associated inlet 66 of the nacelle 56 and/or fan section 14. As the volume of air 64 passes across the fan blades 40, a first portion of the air as indicated by arrows 68 is directed or routed into the bypass airflow passage 62 and a second portion of the air as indicated by arrow 70 is directed or routed into the LP compressor 22. The ratio between the first portion of air 68 and the second portion of air 70 is commonly known as a bypass ratio. The pressure of the second portion of air 70 is then increased as it is routed through the high pressure (HP) compressor 24 and into the combustion section 26, where it is mixed with fuel and burned to provide combustion gases 72.

The combustion gases 72 are routed through the HP turbine 28 where a portion of thermal and/or kinetic energy from the combustion gases 72 is extracted via sequential stages of HP turbine stator vanes 74 that are coupled to the outer casing 18 and HP turbine rotor blades 76 that are coupled to the HP shaft or spool 34, thus causing the HP shaft or spool 34 to rotate, thereby supporting operation of the HP compressor 24. The combustion gases 72 are then routed through the LP turbine 30 where a second portion of thermal and kinetic energy is extracted from the combustion gases 72 via sequential stages of LP turbine stator vanes 78 that are coupled to the outer casing 18 and LP turbine rotor blades 80 that are coupled to the LP shaft or spool 36, thus causing the LP shaft or spool 36 to rotate, thereby supporting operation of the LP compressor 22 and/or rotation of the fan 38.

The combustion gases 72 are subsequently routed through a jet exhaust nozzle section 32 of the core turbine engine 16 to provide propulsive thrust. Simultaneously, the pressure of the first portion of air 68 is substantially increased as the first portion of air 68 is routed through the bypass airflow passage 62 before it is exhausted from a fan nozzle exhaust section 84 of the turbofan 10 also providing propulsive thrust. The HP turbine 28, the LP turbine 30, and the jet exhaust nozzle section 32 at least partially define a hot gas path 86 for routing the combustion gases 72 through the core turbine engine 16.

It should be appreciated, however, that the exemplary turbofan engine 10 described above with reference to FIG. 1 is provided by way of example only, and that in other exemplary embodiments any other suitable turbofan engine, such as an open rotor/un-ducted turbofan engine, may be provided. Additionally, in still other exemplary embodiments, aspects of the present disclosure may be incorporated into any other suitable gas turbine engine, such as a turboprop engine.

Figure 2:
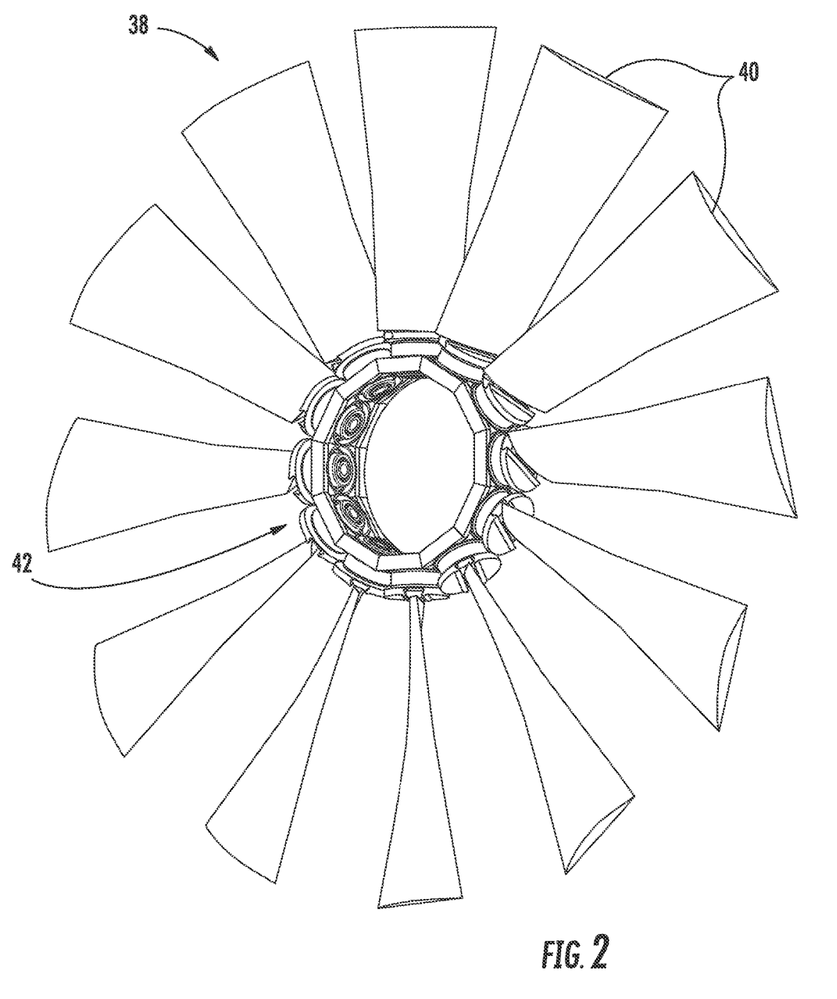
FIG. 2 is perspective view of a variable pitch fan of the exemplary gas turbine engine of FIG. 1 in accordance with an exemplary embodiment of the present disclosure.
Figure 3:
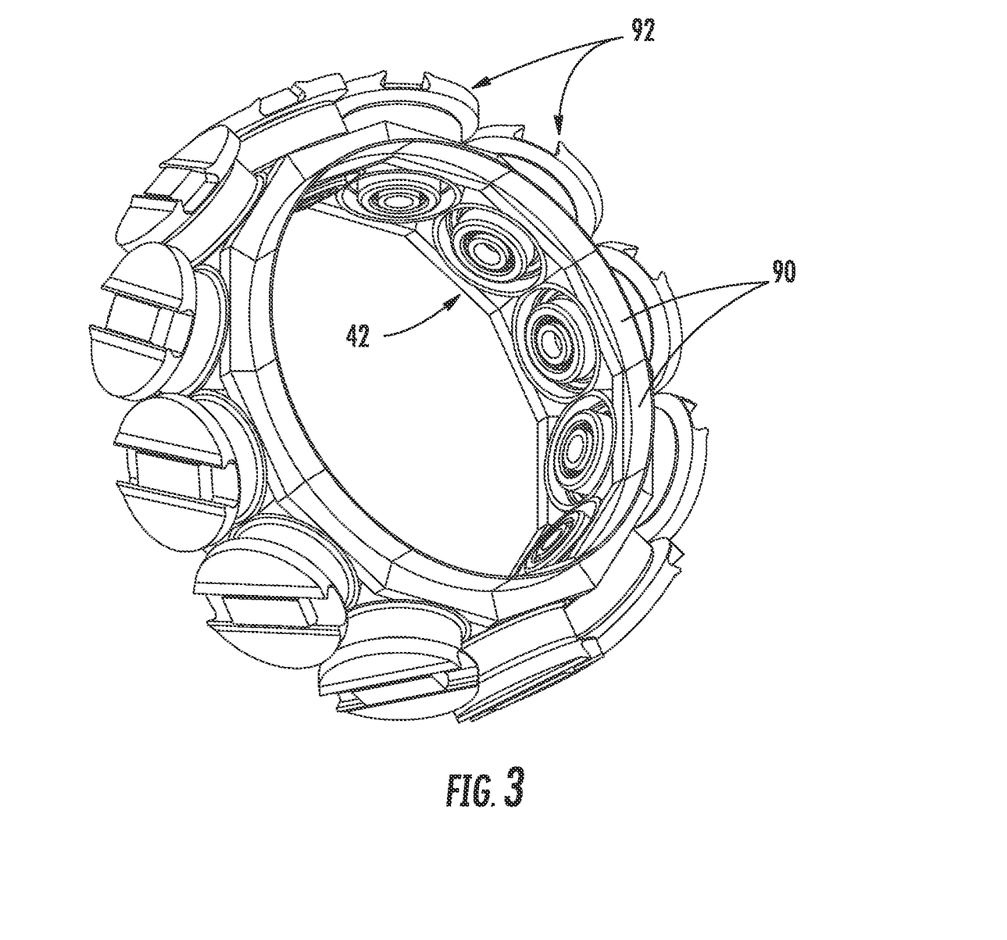
FIG. 3 is a perspective view of a disk and associated trunnion mechanisms of the exemplary variable pitch fan of FIG. 2.

Referring now to FIGS. 2 and 3 the fan 38 will be described in greater detail. FIG. 2 provides a perspective view of the fan 38 of the exemplary turbofan engine 10 of FIG. 1, and FIG. 3 provides a perspective view of the disk 42 of the fan 38 of the exemplary turbofan engine 10 of FIG. 1.

For the exemplary embodiment depicted, the fan 38 includes twelve (12) fan blades 40. From a loading standpoint, such a blade count enables the span of each fan blade 40 to be reduced such that the overall diameter of fan 38 is also able to be reduced (e.g., to about twelve feet in the exemplary embodiment). That said, in other embodiments, fan 38 may have any suitable blade count and any suitable diameter. For example, in one suitable embodiment, the fan may have at least eight (8) fan blades 40. In another suitable embodiment, the fan may have at least twelve (12) fan blades 40. In yet another suitable embodiment, the fan may have at least fifteen (15) fan blades 40. In yet another suitable embodiment, the fan may have at least eighteen (18) fan blades 40.

Additionally, the disk 42 includes a plurality of disk segments 90 that are rigidly coupled together or integrally molded together in a generally annular shape (e.g., a polygonal shape). One fan blade 40 is coupled to each disk segment 90 at a trunnion mechanism 92 that facilitates retaining its associated fan blade 40 on disk 42 during rotation of disk 42 (i.e., trunnion mechanism 92 facilitates providing a load path to disk 42 for the centrifugal load generated by fan blades 40 during rotation about engine centerline axis 12), while still rendering its associated fan blade 40 rotatable relative to disk 42 about pitch axis P.

Figure 4:
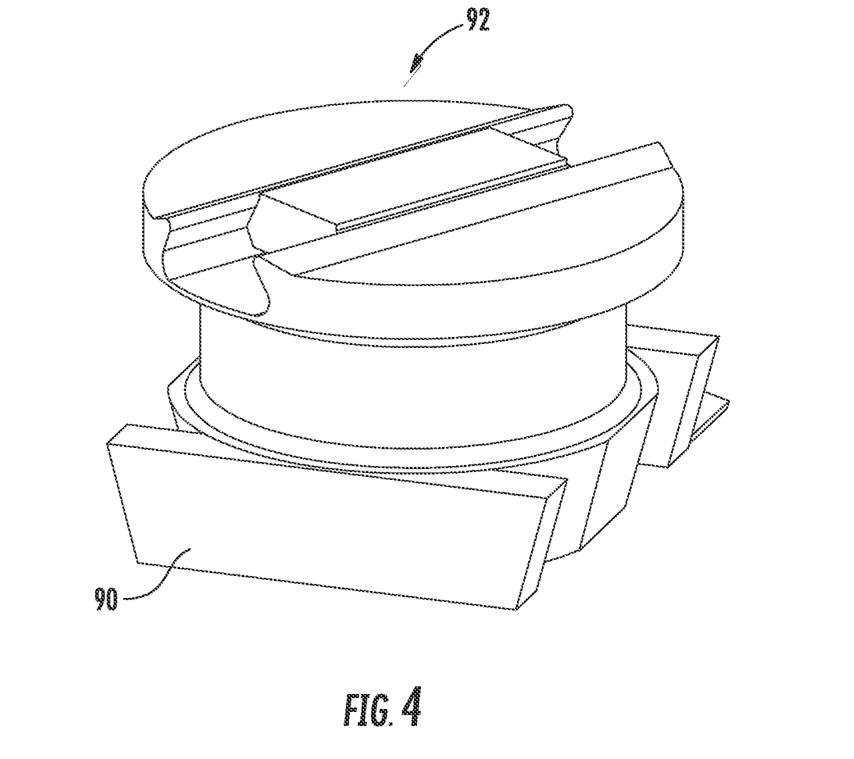
FIG. 4 is a perspective view of a segment of the disk and one of the associated trunnion mechanisms of FIG. 3.
Figure 5:
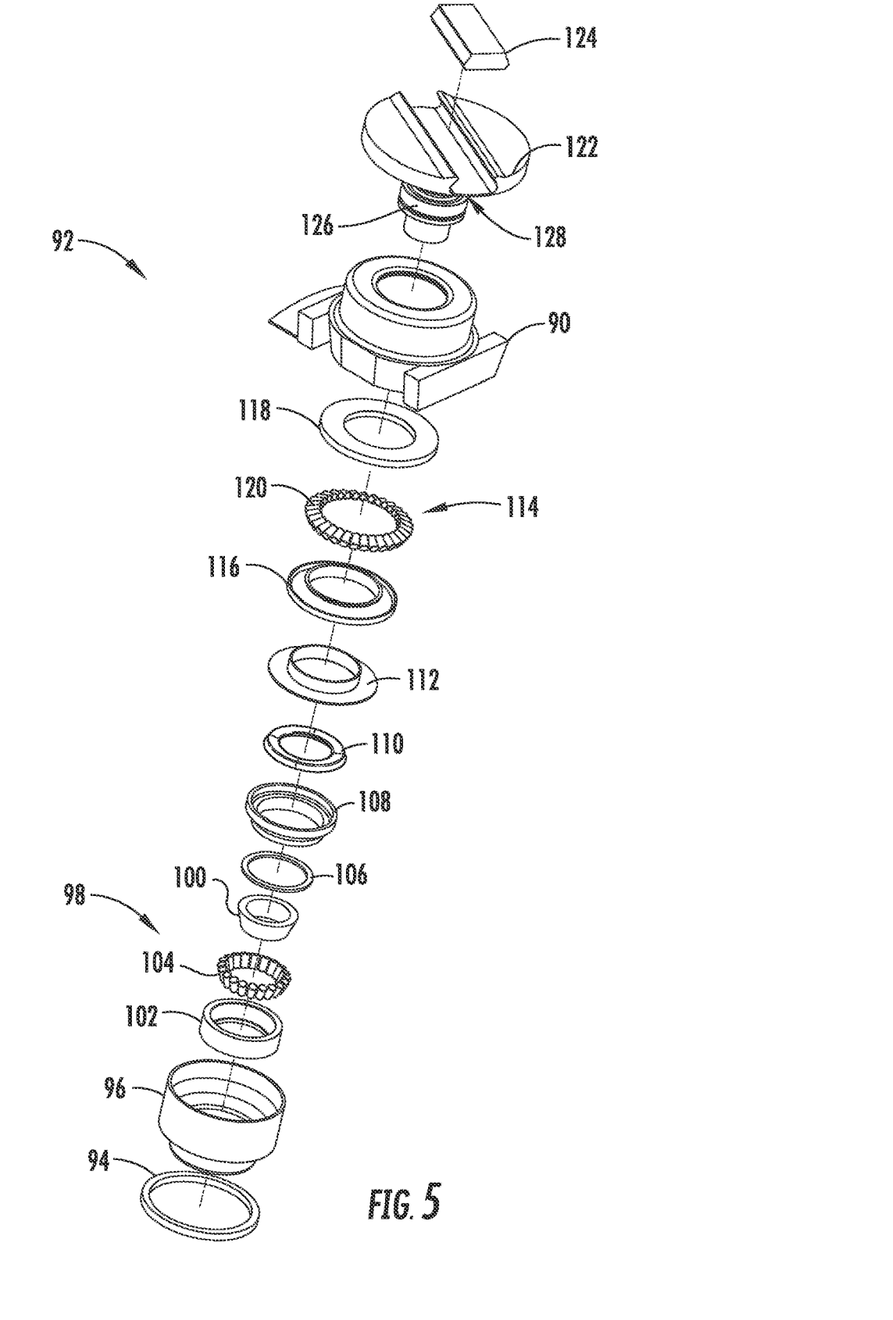
FIG. 5 is an exploded view of the trunnion mechanism shown in FIG. 4.
Figure 6:
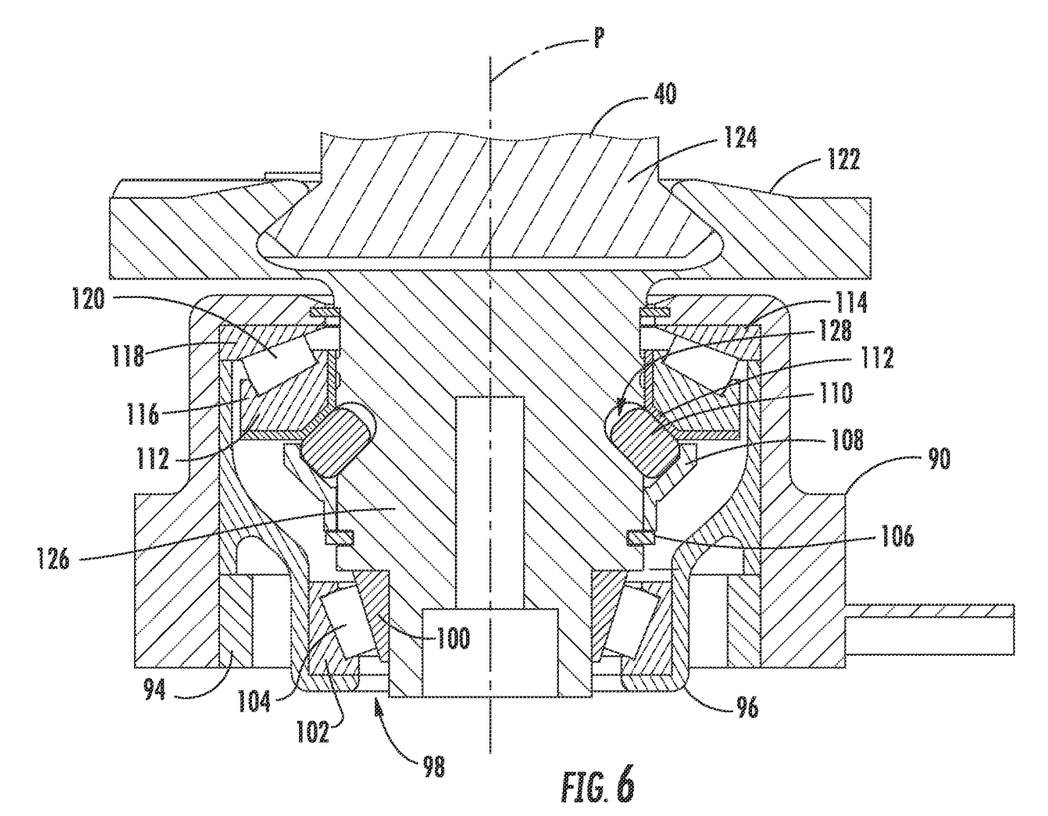
FIG. 6 a cross-sectional view of the segment of the disk and the trunnion mechanism of FIG. 4 with a blade attached to the trunnion mechanism.
Figure 7:
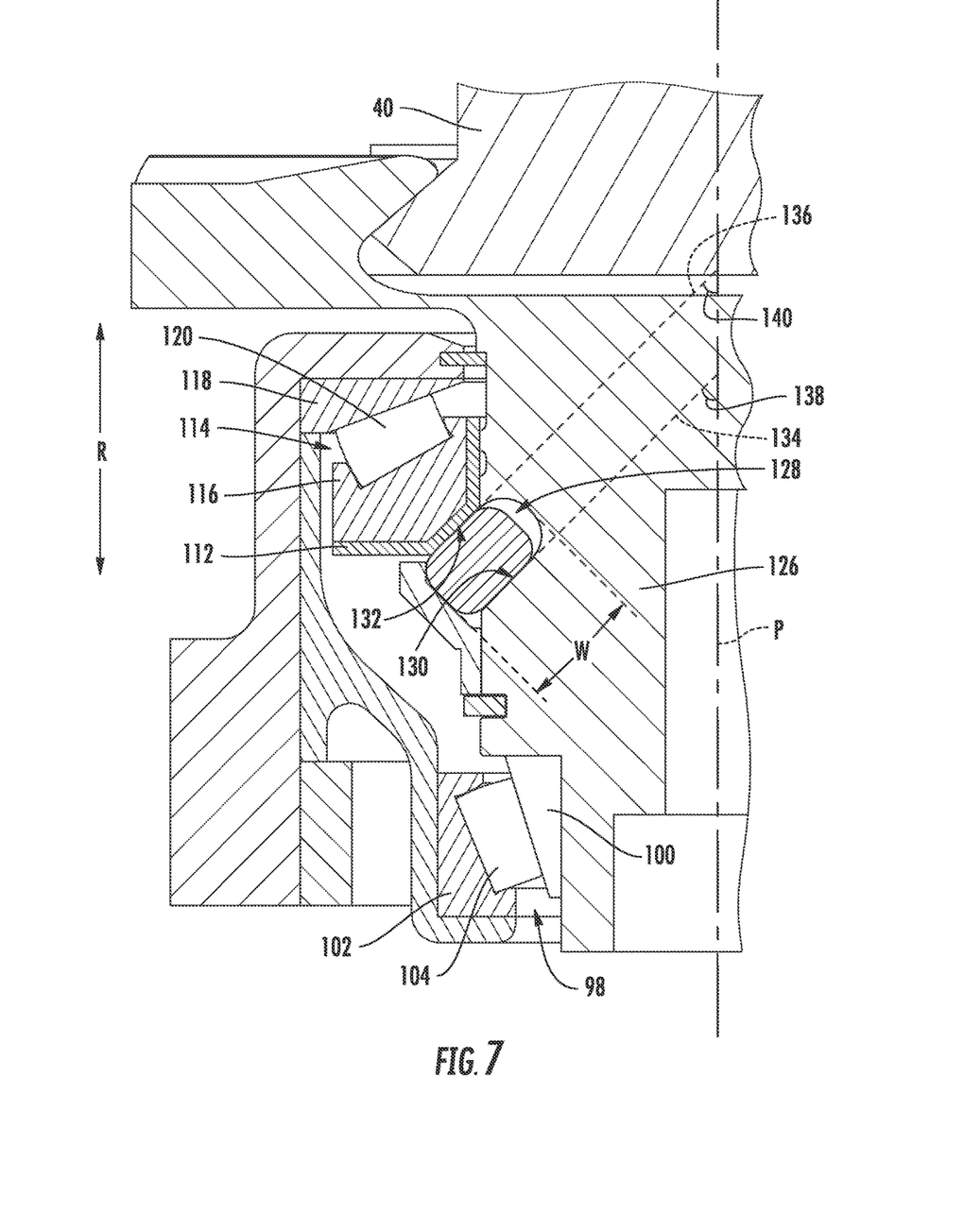
FIG. 7 is an enlarged segment of the cross-sectional view of FIG. 6.

Referring now generally to FIGS. 4 through 7, an individual disk segment 90 and trunnion mechanism 92 in accordance with an exemplary embodiment of the present disclosure is depicted. More specifically, FIG. 4 provides an assembled perspective view of the exemplary disk segment 90 and trunnion mechanism 92; FIG. 5 provides an exploded, perspective view of the exemplary disk segment 90 and trunnion mechanism 92; FIG. 6 provides a side, cross-sectional view of the exemplary disk segment 90 and trunnion mechanism 92; and FIG. 7 provides a close up, cross-sectional view of the exemplary disk segment 90 and trunnion mechanism 92.

In the exemplary embodiment depicted, each trunnion mechanism 92 extends through its associated disk segment 90 and includes: a coupling nut 94; a lower bearing support 96; a first line contact bearing 98 (having, for example, an inner race 100, an outer race 102, and a plurality of rollers 104); a snap ring 106; a key hoop retainer 108; a key 110 (discussed in greater detail below); a bearing support 112; a second line contact bearing 114 (having, for example, an inner race 116, an outer race 118, and a plurality of rollers 120); and a trunnion 122 which receives a dovetail 124 of a fan blade 40. In alternative embodiments, however, the trunnion 122 may be integrated into a hub of the fan blade 40 as a spar attachment or an additional key may be inserted into overlapping openings of the hub of the fan blade 40 and trunnion 122 to form a pinned root. For use as bearings 98, 114, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. Additionally, the bearings may be formed of any suitable material, such as a suitable stainless steel or other metal material, or alternatively of any suitable nonferrous material.

Referring particularly to FIG. 6, in the exemplary embodiment depicted, the first line contact bearing 98 is oriented at a different angle than the second line contact bearing 114. More specifically, line contact bearings 98, 114 are preloaded against one another in a face-to-face (or duplex) arrangement, wherein centerline axes of the bearings 98, 114 are oriented substantially perpendicular to one another.

It should be appreciated, however, that in other exemplary embodiments, the line contact bearings 98, 114 may instead be arranged in tandem so as to be oriented substantially parallel to one another. It should also be appreciated that in other exemplary embodiments, the trunnion mechanism 92 may additionally or alternatively include any other suitable type of bearing, formed of any suitable material. For example, in other exemplary embodiments, the trunnion mechanism 92 may include roller ball bearings or any other suitable bearing.

When assembled, the coupling nut 94 is threadably engaged with disk segment 90 so as to sandwich the remaining components of trunnion mechanism 92 between coupling nut 94 and disk segment 90, thereby retaining trunnion mechanism 92 attached to disk segment 90. Moreover, as is depicted, the individual disk segment 90 and trunnion mechanism 92 depicted includes a keyed configuration for carrying a centrifugal load of the fan blade 40 during operation. The centrifugal load, which may generally be a function of a mass of the fan blade 40 and a rotational speed of the fan blade 40, can be relatively high during operation of the fan 38 of the turbofan engine 10.

The keyed configuration depicted is formed generally by the trunnion mechanism 92, the disk segment 90, and the key 110. Specifically, the trunnion mechanism 92 includes a base 126 defining a key slot 128. For the embodiment depicted, the key slot 128 extends around a circumference of the base 126 of the trunnion mechanism 92 in a plane substantially perpendicular to the pitch axis P. The base 126 of the trunnion mechanism 92 extends at least partially through, i.e., into, the disk segment 90. Notably, the disk segment 90 includes a support member, which for the embodiment depicted is configured as the bearing support member 112. The key 110 is positioned at least partially in the key slot 128 defined in the base 126 of the trunnion mechanism 92 and further is positioned adjacent to the bearing support member 112 of the disk segment 90. A key retainer, i.e., the key hoop retainer 108, is attached to the base 126 of the trunnion mechanism 92 and configured for holding the key 110 in position. With such a configuration, the key 110 may retain the base 126 of the trunnion mechanism 92 at least partially within the disk segment 90 during operation of the fan 38. More specifically, as will be discussed below in greater detail, the key 110 is configured for carrying a centrifugal load of the fan blade 40 and transferring such centrifugal load to the disk segment 90 during operation of the fan 38.

Referring now particularly to FIG. 7, the key 110 and trunnion mechanism 92 define a first, radially inner contact line 130 between the key 110 and the key slot 128. Additionally, the key 110 and disk segment 90 define a second, radially outer contact line 132 between the key 110 and the bearing support member 112. As used herein, the term "contact line" refers to a line defined by two components where the two components are physically contacting one another. As may be seen in FIG. 7, for the embodiment depicted, the key 110 defines a width W in a direction parallel to the first and second contact lines 130, 132. Additionally, the first and second contact lines 130, 132 each define a length. The lengths of the first and second contact lines 130, 132 are at least about twenty-five percent of the width W of the key 110. More particularly, for the embodiment depicted, the lengths of the first and second contact lines 130, 132 are each at least about fifty percent, at least about seventy percent, or at least about ninety percent of the width of the key 110.

Moreover, the first and second contact lines 130, 132 defined at least in part by the key 110 respectively define a first contact reference line 134 and a second contact reference line 136. The first and second contact reference lines 134, 136 extend to and intersect with the pitch axis P. Further, the first contact reference line 134 defines a first angle 138 with the pitch axis P and the second contact reference line 136 defines a second angle 140 with the pitch axis P. For the embodiment depicted, the first and second angles 138, 140 defined by the first and second contact reference lines 134, 136 with the pitch axis P, respectively, are greater than 0 degrees and less than 90 degrees. More particularly, for the embodiment depicted, the first and second angles 138, 140 defined by the first and second contact reference lines 134, 136 with the pitch axis P are greater than about thirty degrees and less than about sixty degrees. For example, in certain exemplary embodiments, the first and second angles 138, 140 defined by the first and second contact reference lines 134, 136 with the pitch axis P may each approximately forty-five degrees. It should be appreciated, that as used herein, terms of approximation, such as "about" or "approximately," refer to being within a ten percent margin of error.

Figure 8:
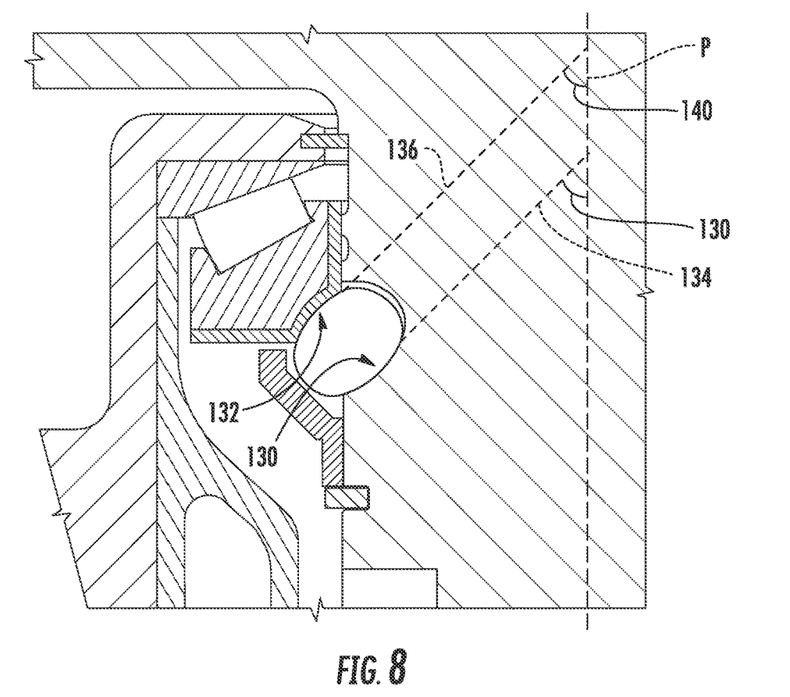
FIG. 8 is an enlarged, cross-sectional view of a disk and trunnion mechanism in accordance with another exemplary embodiment of the present disclosure.

Notably, for the embodiment depicted, the first contact line 130 is substantially parallel to the second contact line 132. Accordingly, the first and second angles 138, 140 defined by the first and second contact reference lines 134, 136 with the pitch axis P may be substantially the same. However, in other exemplary embodiments, the first and second contact lines 130, 132 may not be substantially parallel, and thus the first angle 138 defined by the first contact reference line 134 with the pitch axis P may be different than the second angle 140 defined by the second contact reference line 136 with the pitch axis P. Moreover, for the embodiment depicted, the first and second contact lines 130, 132 are each substantially straight contact lines. However, in other exemplary embodiments, the first and/or second contact lines 130, 132 may define a bend or curve. For example, referring briefly to FIG. 8 providing a close-up, cross-sectional view of a disk segment 90 and trunnion mechanism 92 in accordance with another exemplary embodiment of the present disclosure, the first and second contact lines 130, 132 define a curve. With such an exemplary embodiment, the first and second contact lines 130, 132 may still define respective reference lines 134, 136 extending to and intersecting with the pitch axis P and defining an angle with the pitch axis P, such as the first and second angles 138, 140 described above. However, the exemplary reference lines 134, 136 depicted with such an exemplary embodiment may extend, as shown, along a mean line of the respective first and second contact lines 130, 132.

Furthermore, it should be appreciated, that although the exemplary key 110 depicted in FIGS. 4 through 7 is depicted as an axis symmetric key, in other exemplary embodiments, the key 110 may not be axis symmetric. For example, in other exemplary embodiments, the key 110 may be configured as a "C-clip" or alternatively as a plurality of individual, straight pins extending through correspondingly shaped key slots in the base 126 of the trunnion mechanism 92.

Referring back to FIG. 7, during operation of the turbofan engine 10, and more particularly of the variable pitch fan 38 of the turbofan engine 10, the trunnion mechanism 92, disk segment 90, and key 110 define a load path for carrying a centrifugal load of the fan blade 40. For the embodiment depicted, the load path extends from the trunnion mechanism 92, through the first contact line 130 to the key 110, and from the key 110 through the second contact line 132 to the bearing support member 112 of the disk segment 90. Such a configuration may better accommodate the centrifugal loads generated by the fan blade 40 during operation of the variable pitch fan 38. More particularly, given the angle of the first and second contact lines 132 relative to the pitch axis P, the key 110, key slot 128, and bearing support member 112 are configured such that minimal stress concentrations are generated. Thus, a smaller key 110 (and smaller key slot 128 and bearing support member 112) are required to carry the same centrifugal loads of the fan 38.

Figure 9:
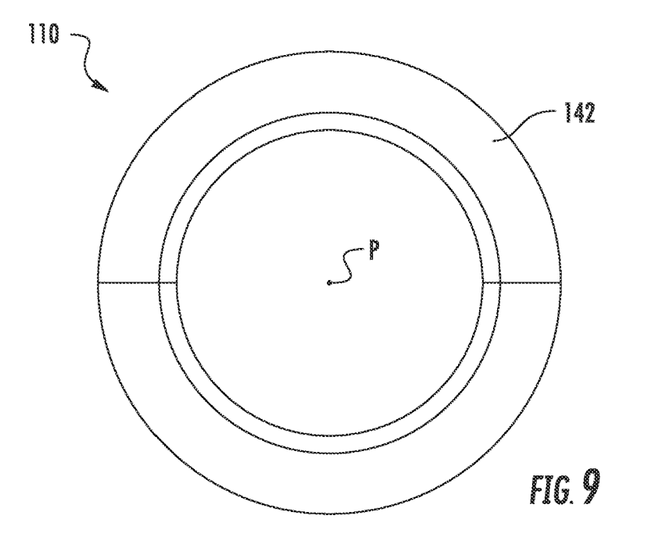
FIG. 9 is a top view of a key in accordance with an exemplary embodiment of the present disclosure.

Referring now also briefly to FIG. 9, a close-up view of a key 110 in accordance with an exemplary embodiment present disclosure is provided. In certain exemplary embodiments, the key 110 may be configured in substantially the same manner as the exemplary key 110 discussed above reference to FIGS. 4 through 7. For the embodiment depicted, the key 110 is configured as being substantially axis symmetric about the pitch axis P, and is formed of a plurality of individual key members 142. Specifically for the embodiment depicted, the key 110 is formed of two individual key members 142. However in other exemplary embodiments, the key 110 may instead be formed of any other suitable number of key members 142. For example, in other exemplary embodiments, the key 110 may be formed of four or more key member 142, six or more key members 142, twelve or more key members 142, sixteen or more key members 142, or twenty or more key members 142.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable pitch fan for a gas turbine engine, the variable pitch fan comprising:
   a fan blade defining a radially inner end and a pitch axis;
   a trunnion mechanism including a base defining a key slot, the radially inner end of the fan blade attached to the trunnion mechanism;
   a disk including a disk segment having a support member, the base of the trunnion mechanism extending at least partially through the disk segment; and
   a key positioned at least partially in the key slot of the base of the trunnion mechanism and adjacent to the support member of the disk segment for retaining the base of the trunnion mechanism at least partially within the disk segment, the key defining a first contact line between the key and the key slot and a second contact line between the key and the support member, the first and second contact lines respectively defining a first contact reference line and a second contact reference line, the first and second contact reference lines defining an angle with the pitch axis of the fan blade greater than zero degrees (0°) and less than ninety degrees (90°).

2. The variable pitch fan of claim 1, wherein the first contact line is substantially parallel to the second contact line.

3. The variable pitch fan of claim 1, wherein the key is formed of a plurality of individual key members.

4. The variable pitch fan of claim 1, wherein the first and second contact reference lines each define an angle with the pitch axis greater than about thirty degrees (30°) and less than about sixty degrees (60°).

5. The variable pitch fan of claim 1, wherein the first and second contact reference lines each define an angle with the pitch axis of approximately forty-five degrees (45°).

6. The variable pitch fan of claim 1, wherein the key is substantially axisymmetric about the pitch axis.

7. The variable pitch fan of claim 1, wherein the trunnion mechanism, the disk, and the key define a load path for carrying a centrifugal load of the fan blade during operation of the variable pitch fan, wherein the load path extends from the trunnion mechanism, through the first contact line to the key, and through the second contact line to the support member of the disk segment.

8. The variable pitch fan of claim 1, wherein the disk segment includes a bearing assembly having a bearing support member, and wherein the support member is configured as the bearing support member.

9. The variable pitch fan of claim 1, further comprising
a key retainer attached to the base of the trunnion for holding the key in position.

10. The variable pitch fan of claim 1, wherein the key slot defined in the base of the trunnion mechanism extends around a circumference of the trunnion mechanism in a plane substantially perpendicular to the pitch axis.

11. The variable pitch fan of claim 1, wherein the pitch axis is substantially parallel to a radial direction of the gas turbine engine.

12. A gas turbine engine defining a radial direction and comprising:
a core; and
a variable pitch fan in airflow communication with the core, the variable pitch fan comprising
a fan blade defining a radially inner end and a pitch axis extending substantially parallel to the radial direction of the gas turbine engine;
a trunnion mechanism including a base defining a key slot, the radially inner end of the fan blade attached to the trunnion mechanism;
a disk including a disk segment having a support member, the base of the trunnion mechanism extending at least partially through the disk segment; and
a key positioned at least partially in the key slot of the base of the trunnion mechanism and adjacent to the support member of the disk segment for retaining the base of the trunnion mechanism at least partially within the disk segment, the key defining a first contact line between the key and the key slot and a second contact line between the key and the support member, the first and second contact lines respectively defining a first contact reference line and a second contact reference line, the first and second contact reference lines defining an angle with the pitch axis of the fan blade greater than zero degrees (0°) and less than ninety degrees (90°).

13. The gas turbine engine of claim 12, wherein the first contact line is substantially parallel to the second contact line.

14. The gas turbine engine of claim 12, wherein the key is formed of a plurality of individual key members.

15. The gas turbine engine of claim 12, wherein the first and second contact reference lines each define an angle with the pitch axis greater than about thirty degrees (30°) and less than about sixty degrees (60°).

16. The gas turbine engine of claim 12, wherein the key is substantially axisymmetric about the pitch axis.

17. The gas turbine engine of claim 12, wherein the trunnion mechanism, the disk, and the key define a load path for carrying a centrifugal load of the fan blade during operation of the variable pitch fan, wherein the load path extends from the trunnion mechanism, through the first contact line to the key, and through the second contact line to the support member of the disk segment.

18. The gas turbine engine of claim 12, wherein the disk segment includes a bearing assembly having a bearing support member, and wherein the support member is configured as the bearing support member.

19. The gas turbine engine of claim 12, wherein the key slot defined in the base of the trunnion mechanism extends around a circumference of the trunnion mechanism in a plane substantially perpendicular to the pitch axis.

20. The gas turbine engine of claim 12, wherein the pitch axis is substantially parallel to a radial direction of the gas turbine engine.

* * * * *